J. H. McELROY.
VOTING MACHINE.
APPLICATION FILED OCT. 17, 1910.
1,075,718.
Patented Oct. 14, 1913.
6 SHEETS—SHEET 4.
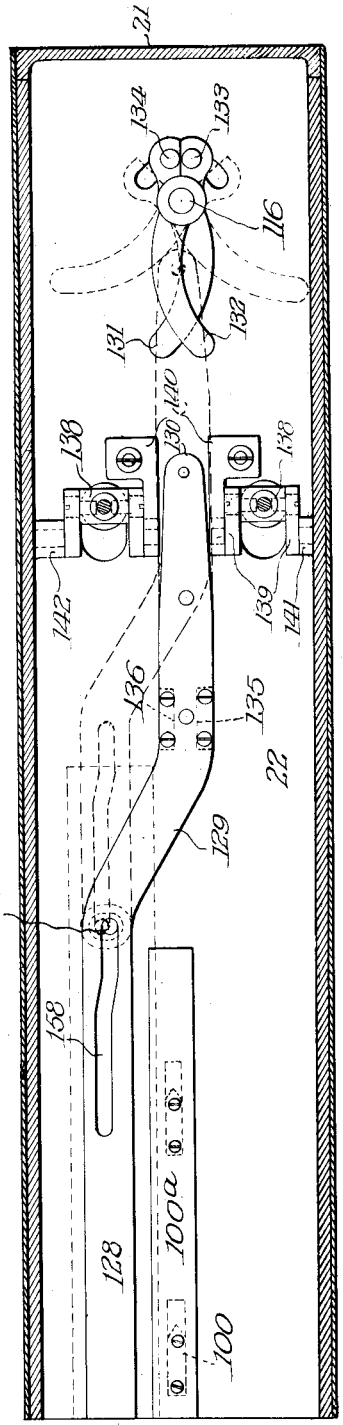
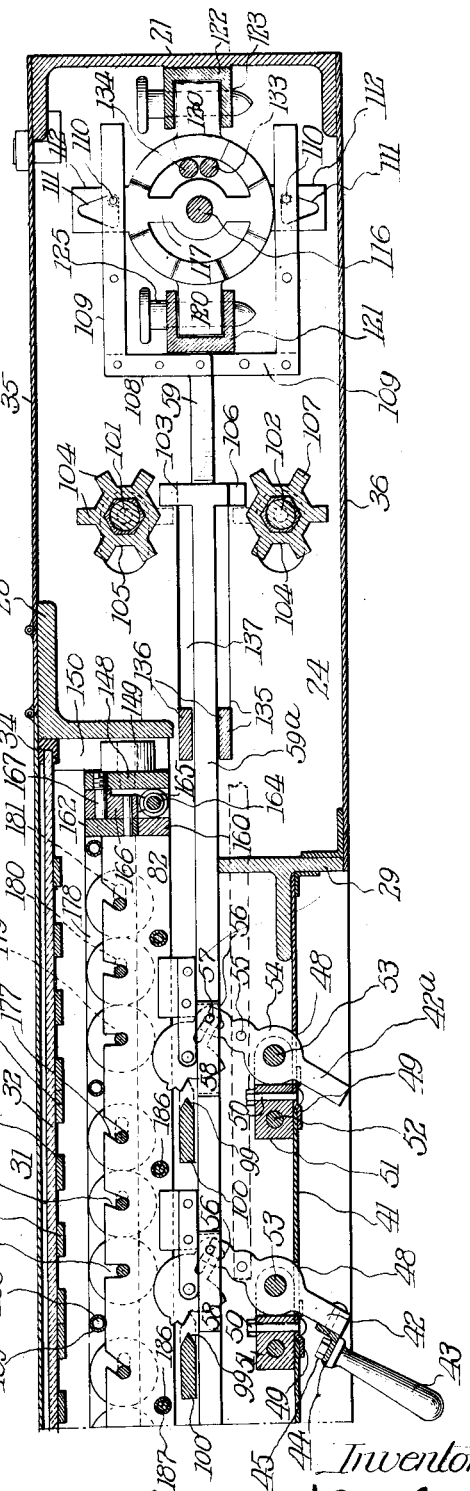

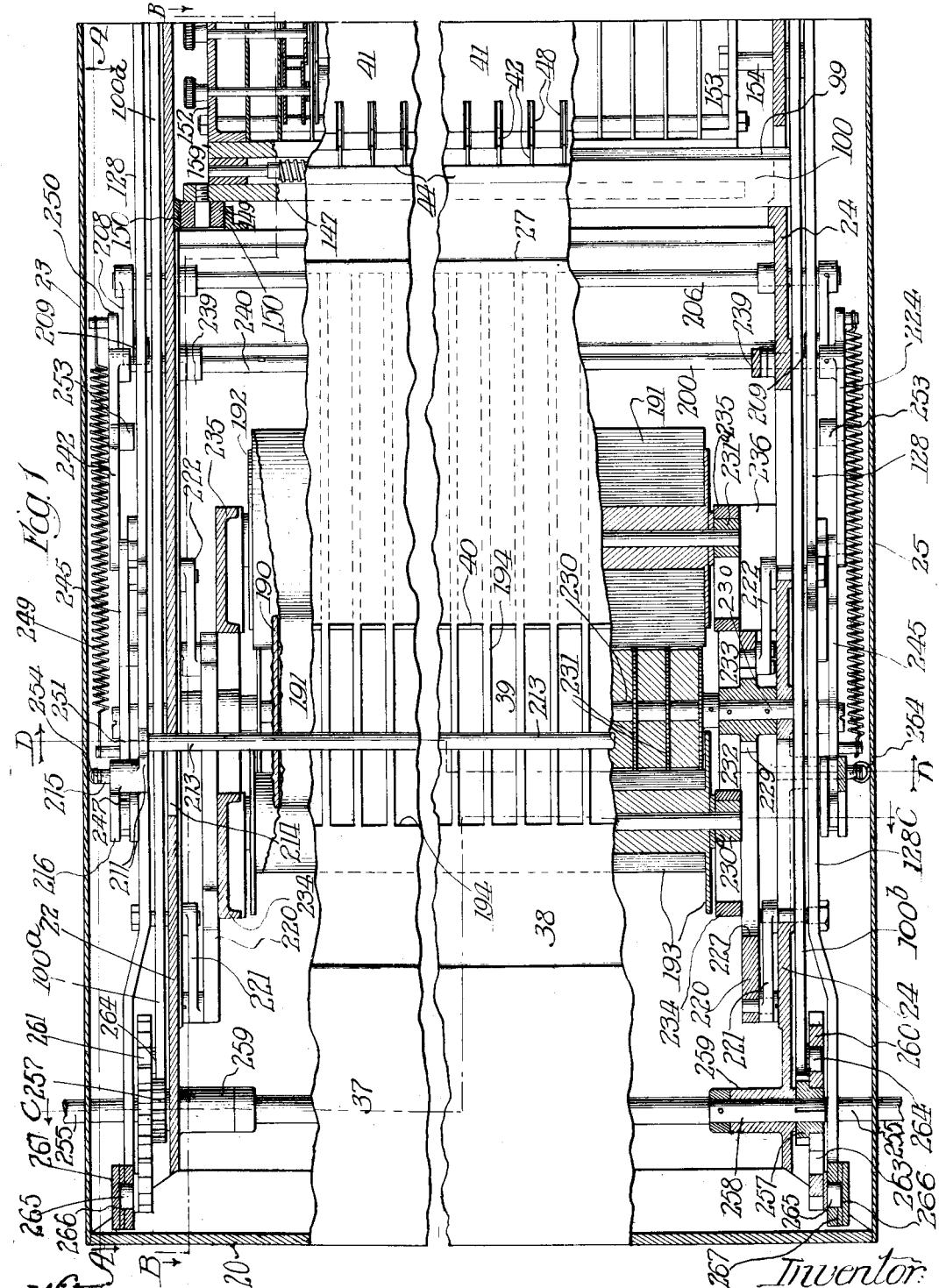

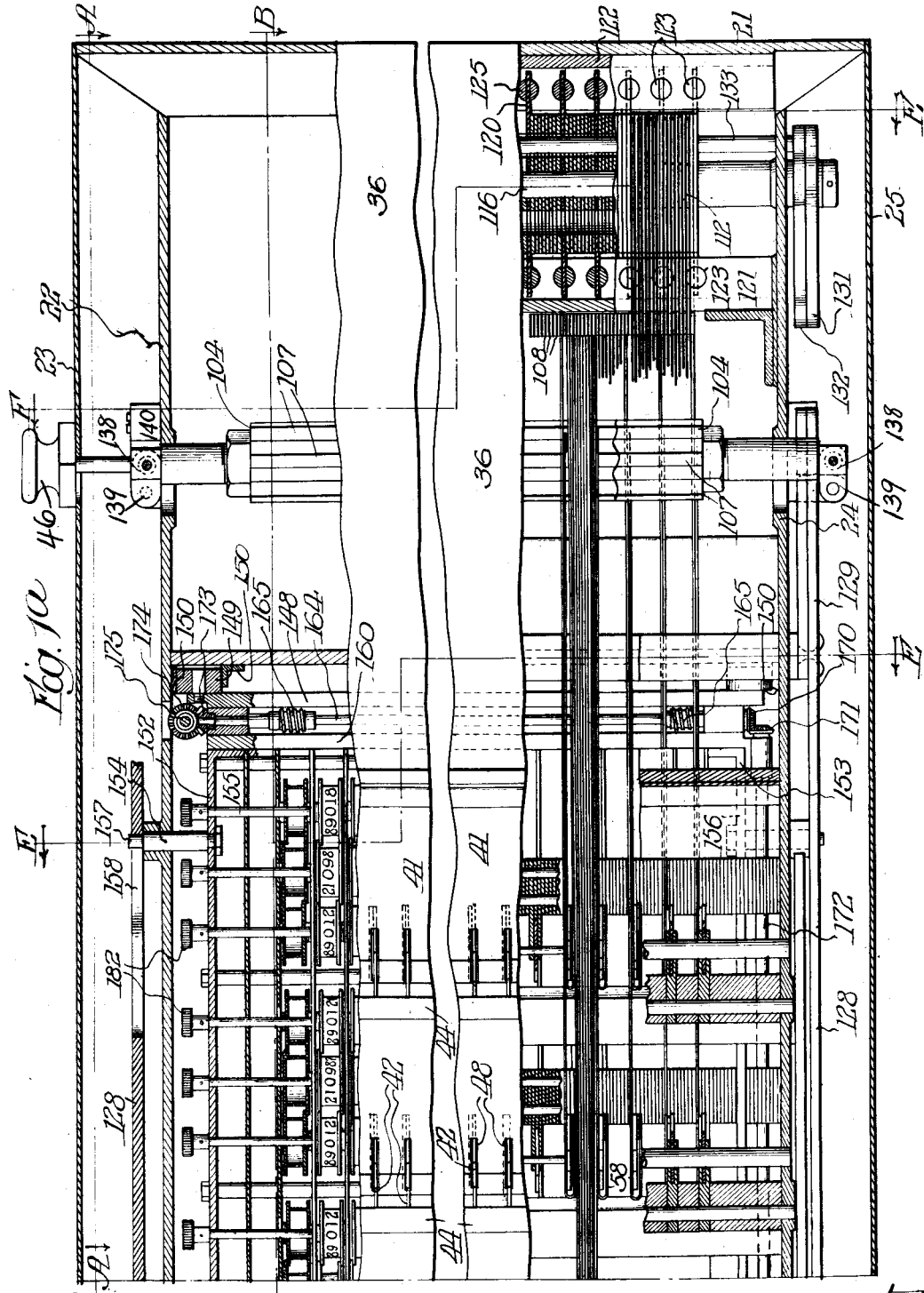

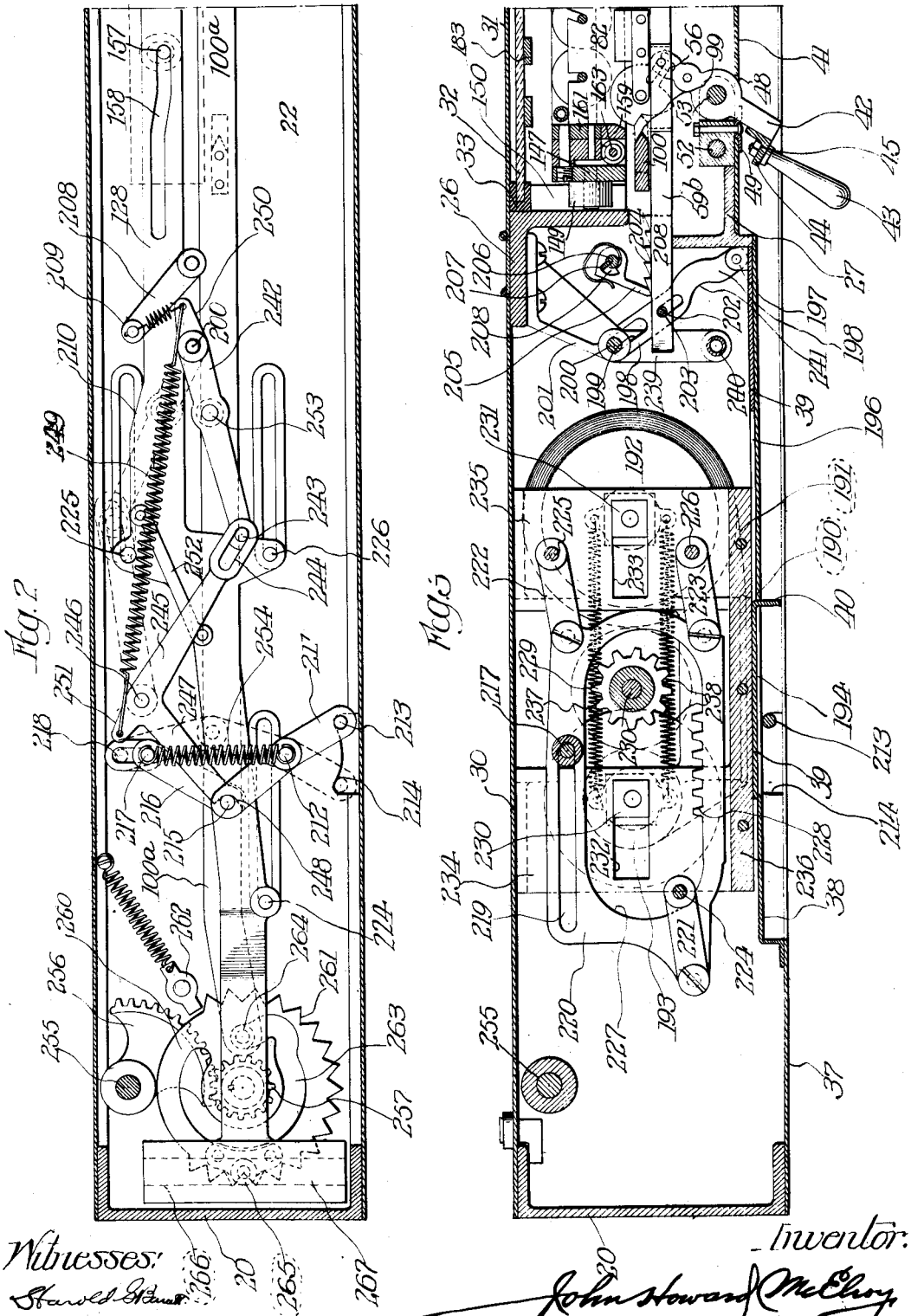

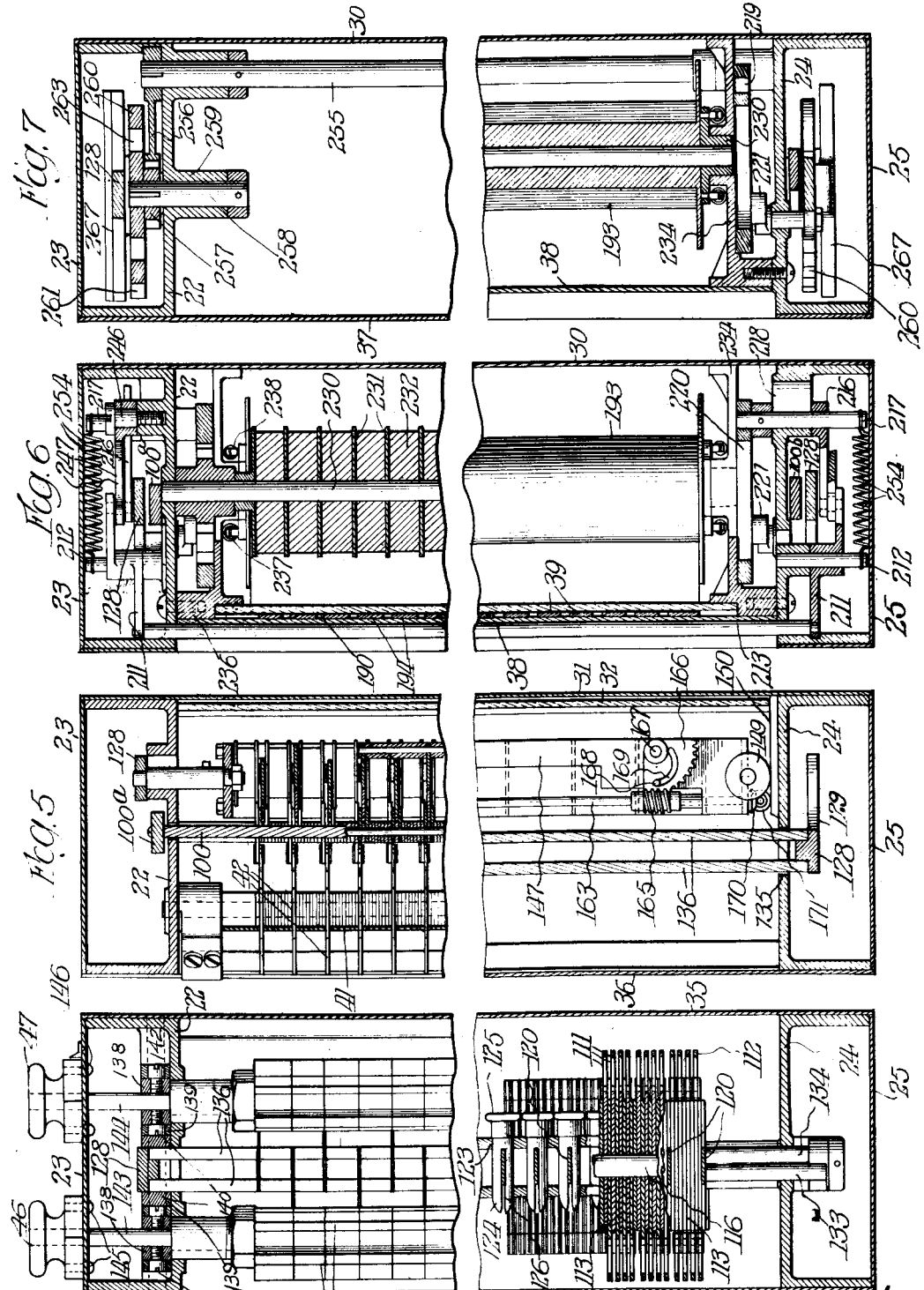

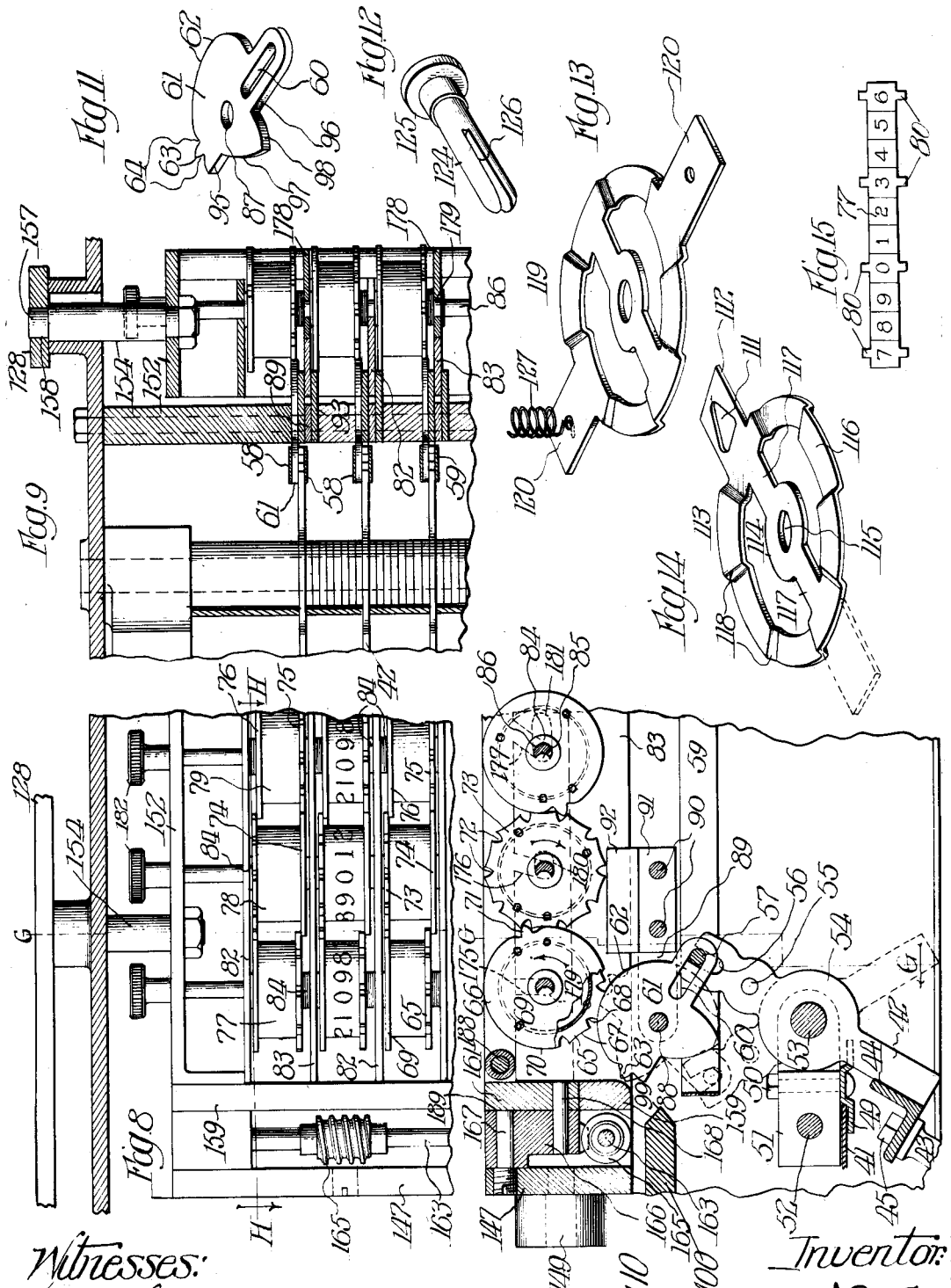

UNITED STATES PATENT OFFICE.

JOHN HOWARD McELROY, OF CHICAGO, ILLINOIS.

VOTING-MACHINE.

1,075,718. Specification of Letters Patent. Patented Oct. 14, 1913.

Application filed October 17, 1910. Serial No. 587,360.

*To all whom it may concern:*

Be it known that I, JOHN HOWARD MC-ELROY, a citizen of the United States, and a resident of Chicago, in the county of Cook and State of Illinois, have invented certain new and useful Improvements in Voting-Machines, of which the following is a full, clear, and exact specification.

My invention is concerned with voting machines, adapted for use in general elections, and embodies certain improvements in the interlocking mechanism; (2) the free ballot mechanism; (3) the registers; (4) the zero resetting mechanism; and (5) in the general construction of the machine as a whole.

To illustrate my invention, I annex hereto six sheets of drawings in which the same reference characters are used to designate identical parts in all the figures, of which—

Figures 1 and 1ª are front elevations of the left- and right-hand ends respectively of the machine, with a portion of the mechanism at the top and bottom broken away and in vertical section; Figs. 2 and 2ª are top plan views in section on the lines A—A of Figs. 1 and 1ª; Figs. 3 and 3ª are similar views in section on the lines B—B of Figs. 1 and 1ª; Figs. 4, 5, 6 and 7 are vertical sections on the lines C—C, D—D, E—E and F—F of Figs. 1 and 1ª; Fig. 8 is a detail showing a portion of the register frame on a large scale; Fig. 9 is a similar view in section on the line G—G of Fig. 8; Fig. 10 is a plan view in section on the line H—H of Fig. 8: Fig. 11 is a perspective view of one of the actuators; Fig. 12 is a similar view of one of the securing pins for the abutments of the interlocking mechanism; Fig. 13 is a perspective view of one of said abutments; Fig. 14 is a perspective view of one of the interlocking members: and Fig. 15 is a side elevation of a portion of one of the register wheels before the wheel is finally formed.

In carrying out my invention, I employ a framework and casing, the ends of which may be conveniently constructed of the channels 20 and 21, the top of which may be constructed of the generally channel-shaped casting 22, the open top of which is covered by the plate 23, while the bottom is constructed of the same channel-shaped casting 24, the open side of which is closed by the bottom plate 25. Extending between the castings 22 and 24 toward the left-hand end is the heavy angle iron 26 and the substantially opposed T bar 27, which is trimmed down to the shape shown, the angle iron and the T bar together constituting a sort of a division between the compartment in the left-hand end of the machine which contains the free balloting mechanism and the central compartment which contains the registering mechanism. Toward the right-hand end of the machine is a similar angle iron 28 and T bar 29, which together constitute a sort of a partition between the central chamber containing the registering mechanism and the right-hand end chamber which contains the interlocking mechanism proper and the lockout mechanism used for limited franchise. The rear of the casing is formed of sheet steel, which preferably has the door 30 therein to give access to the free balloting mechanism for changing the paper rolls, together with the door 31 which extends back of the register frame and when opened permits the registers to be seen through the glass covering 32, which is supported in the channel pieces 33 and 34, secured to the angle irons 26 and 28 respectively as seen in Figs. 3 and 3ª. At the right hand end of the machine is provided the door 35 in the back of the casing, which gives admission to the interlocking mechanism when it is desired to change the same for different arrangements of single- and multi-candidate groups. The front portion 36 of the casing between the end piece 21 and the T bar 29 and the portion 37 at the left-hand end of the casing, are flush with the outermost surface entirely across the machine, while the portion 38 extending from the portion 37 to the T bar 27 is slightly inset between the top and bottom pieces 22 and 24, in order to furnish a sort of a protecting pocket for the free balloting slides 39 which have the turned-out operating ends 40 projecting into the aforesaid pocket. The front plate 41 extending between the T bars 27 and 29 makes another still deeper pocket which is designed to furnish protection for the outer ends of the operating keys 42 when they are in their operated or unoperated position, and the handles 43, by which the straight ticket angle iron bars 44 are operated, are detachably secured thereto by the nuts 45 so that they can be taken off and the machine remains as a rectangular casing with no projecting parts except the adjusting knobs 46 and 47 (see Figs. 1ª and 4) of the lockout or limited franchise mechanism, and I may, if desired, arrange these knobs so that they can be removed and leave nothing projecting from the surface of the casing. The front wall 41, instead of being a continuous piece of metal, is preferably made up of a plurality of vertical strips, each of which has the recesses 48 for the keys 42 at its edges, and is adapted to be held between the strips 49, which are held by the bolts 50 to the party column supports 51 which are preferably built up of blocks strung on the rods 52 and 53 extending and held taut between the castings 22 and 24 and having the blocks directly opposed to the keys 42 cut away so as to leave a space accommodating the keys and furnishing a bearing to prevent any cramping while they turn on the pivot or journal furnished by the rod 53.

The keys 42 are preferably made of thin sheet metal and are stamped into the shape shown, with the central disk-like portion 54 furnished with the recess for the rod 53 and with the aperture 55, to which may be connected a supplemental interlocking strip terminating in the customary enlargement and coöperating with apertures in the inner web of the T bar 29 when it is desired to limit the number of keys that may be operated in one horizontal row in the multicandidate group in case an indorsed candidate is presented by two or more parties and it is desired to interlock all the keys devoted to this indorsed candidate to prevent any voter casting any more than one vote for him, owing to the fact that his name appears in different columns. The end of the key terminates in the elongated recess 56, through which passes the rivet 57 connecting the backwardly turned end 58 of the interlocking strip 59 with the body of said strap, and this pin or rivet 57 likewise passes through the elongated slot 60 formed in the actuating member 61. This actuating member 61 has the circular locking surface 62, and the actuating lug 63 with the recesses 64 on either side thereof to permit its coacting with the disk 65 of the units wheel 66. The disk 65 is the customary Geneva stop disk with the ten concave locking surfaces 67 and the ten recesses 68, which are engaged by the lug 63 as it is swung from the inoperative position shown in full lines in Fig. 10 to the operative position shown in the dotted lines. Spaced apart a suitable distance from the disk 65 is the disk 69 which has the locking surface 70 and the carrying lug 71 corresponding exactly in its structure and mode of actuation with the actuating lug 63 and like it, flanked by the recesses, which permits its engagement with the recesses 72 of the disk 73 of the tens wheel, which corresponds exactly in structure and operation to the disk 65 of the units wheel. The disk 73 of the tens wheel of course will also have the disk 74 opposed to it and constructed exactly like the disk 69 of the units wheel and this disk, as before, coöperates with the disk 75 of the hundreds wheel, which of course corresponds exactly to the disks 65 and 73 of the units and tens wheels respectively. The hundreds wheel will have the disk 76, which may be, for convenience, manufactured corresponding exactly to the disks 69 and 74 of the units and tens wheels, but in this case, unless a thousands wheel should be employed, the carrying tooth would obviously have no carrying function. The two disks of each wheel are spaced apart by the thin sheet metal strips 77, 78 and 79, which are substantially alike and are preferably provided at their upper and lower edges with the two sets of four lugs 80 which are adapted to pass through the recesses 81 punched in the disks which they connect, so that when the strips 77, 78 and 79 have had the numerals stamped thereon or supplied by means of a strip of paper or celluloid and are rolled into the generally circular form by riveting the ends of the projections 80 to the apertures 81, a very light and substantial wheel is produced. As it is necessary to prevent any interference between the various disks, the strip 78 is made slightly wider than the strips 77 and 79, and between the plates 82 or 83, as the case may be, and the bottoms of the units wheels I interpose say four of the washers 84, which will be seen to have the inwardly projecting lug 85 coöperating with the groove in the rod 86, upon which the register is strung, so that as the rod is turned the washers must necessarily turn with it, and the register wheels resting on the washers will likewise tend to turn with the shaft if they are free to do so. Between the top of the units wheel and plate 82 or 83, as the case may be, I interpose a single one of these washers 84, and with the hundreds wheel I reverse the position of the washers, as will be readily apparent, and with the tens wheel I employ a single washer at the top and the bottom of the wheel, and thus by this arrangement I secure the desired mounting of the various disks of the different registers in the different planes so as to prevent any interference in their operation.

The operating members 61 have the central apertures 87, by which they are strung on the vertical rods 88 extending between the castings 22 and 24, and these operating pieces are spaced apart a suitable distance and given the proper support by means of a series of blocks or plates 89 which are strung on the rods 90 extending between the castings 22 and 24. In the same horizontal plane as the operating pieces 61 are the blocks 91, which are alternated with the ordinary blocks 89, and are just enough thicker than the operating pieces 61 so as to prevent them from binding between the blocks 89, while permitting them to have free play. Directly beneath the block 91 is a block 92 shaped like the block 89 but having the inward extension which overlaps the register plate 83, and separated from the block 92 by another block 89, is a block 93 like the block 92, but located so that its inward extension is beneath the register plate 83, and the register plate 83 extends between the extensions of the blocks 92 and 93 far enough so that when the register frame and all the plates 83 are moved inward to separate the units wheel from the actuating member 61, the plates are held and guided in their horizontal position so that when the register frame is returned there could be no question but what the actuating disks 61 will again reëngage the disk 65 of the units wheel so as to operate properly for the next voter.

The actuating member 61 is provided with the two straight positioning surfaces 95 and 96 and with the two curved positioning surfaces 97 and 98, the surfaces 95 and 97 forming one angle subtending a substantially greater arc than the other angle inclosed by the surfaces 96 and 98. These surfaces are designed to be engaged by the acute angle 99 formed on the edge of the vertical bars 100, of which there is one for each party column and for the yes and no column at the right hand end of the machine, and which bars are secured at their top to the horizontal bar 100$^a$ and at the bottom to the similar bar 100$^b$, which bars are reciprocated as soon as the voter leaves the machine so as to move them from the full line position of Figs. 3 and 3$^a$ to the dotted line position, and then back to the full line position very quickly. If any actuating key has been moved less than say three-fifths of the total movement that should be given it, so that the interlocking mechanism has not been operated, the angle 99 will engage the curved surface 97 and cam that particular operating member back to its original position, thereby resetting its key to its inoperative position and prevent any operation of any register. If, on the other hand, the voter has moved the key more than three-fifths of its total movement, so that the interlocking mechanism has been properly operated, and the register may not have been fully operated, the angle 99 on the bar 100 will engage the surface 98 and cam the member 61 to its full operated position, thereby insuring the complete operation of the register. Of course while I have illustrated the angles having the sides 95 and 97 as subtending an arc one-half greater than that subtended by the angle formed by the sides 96 and 98, it will not be understood that I desire to be limited to that particular arrangement of the two angles, as it might be that the two angles remain equal, so that if the key was moved half way the interlocking mechanism would be fully operated at that time, and the key might be moved on to its full operative position, but resetting automatically if it was moved less than half the way.

The interlocking straps 59 extend horizontally, or substantially so, into the compartment at the right-hand end of the machine containing the interlocking mechanism, and the interlocking strap 59$^a$ connected to the yes and no key 42$^a$ extends to a point beyond the lockout shafts 101 and 102, and terminates in the projection 103 which extends into the plane of the radial projections 104 of the lockout blocks 105 on the shaft 101. The interlocking straps 59 of the candidate keys and of the free balloting mechanism have the projections 106 similarly extending into the plane of the projections 104 of the lockout blocks 107 on the shaft 102, but instead terminating at this point, they extend onward and have the angular extensions 108 extending either to the front or the rear, the alternating interlocking straps extending in alternate directions. Riveted or otherwise secured on these L shaped extensions 108 are the thin metallic strips 109, which consist of the two end portions extending at right angles to the main or body portions, which end portions are riveted to the parts 108. The body portions are folded over to form loops, and these loops are connected at a point toward the end by the pin 110 which passes through the recess 111 in the stem 112 of the interlocking member 113. This interlocking member has the central hub portion 114, which has the aperture 115 by which the interlocking members are strung on the supporting rod 116 extending between and connected to the castings 22 and 24. The interlocking member is also provided with the cam annulus 116, which will be seen to be supported from the hub by the spokes 117 and to have eight bearing surfaces, four of which are in the same central plane and two of which are above said plane and two beneath it, and the various planes are connected by the cam surfaces 118. There is, of course, one of these interlocking members for each candidate key and where the machine is arranged for seven parties and the free ballot, there will be eight of these interlocking members in each group, and the stems 112 of the alternate members will extend in opposite directions. When the interlocking straps are pulled forward the pins 110 will sooner or later, depending upon whether the straps stand exactly horizontally or not, engage the side of the recess 111, and then swing the interlocking member through an angle of at most 45°, or possibly somewhat less, if the interlocking straps should lie in a horizontal plane with the interlocking member, and consequently the pin 110 normally standing at the rear of the slot 111. If, however, a large multi-candidate group is arranged, the uppermost straps in the group will extend at an angle to the interlocking members, with the result that in their inoperative position the pins 110 are near the forward edge of the recess 111 so that the interlocking member is moved almost as soon as the key is moved and the interlocking strap is pulled forward. It will be noted, however, that the cam surfaces 118 occupy a very short angular distance as compared with the surfaces which they connect, so that the interlocking mechanism will operate properly even if a very large multi-candidate group is formed and the straps are inclined at as great an angle as could ever occur with the largest multi-candidate group that is ever required. The recesses 111 are therefore seen to be elongated transversely to permit of this lost motion for multi-candidate grouping purposes while they are elongated radially to permit of the engagement being maintained despite the rotation of the interlocking element, although the interlocking straps move in the straight lines. When any interlocking element is turned, it will be seen that its cam surfaces 118 will serve to separate the adjacent interlocking elements, thus securing a total spread equal to twice the raise of one of the cams. This particular form of interlocking element enables me to secure a very wide spread with a very thin interlocking element, so that the necessary keys for seven, eight or nine parties and the free ballot may be grouped in the space of one-half of an inch, if desired. The abutments 119 to coöperate with these interlocking elements, as will be apparent from Fig. 13, have the same hub, spokes, and cam ring, and differ from interlocking elements only in instead of having the stem 112, it is provided with two stems 120 disposed at right angles to the position of the stems 112, and coöperating with the channels 121 and 122, which extend between the castings 22 and 24, and have at the necessary intervals the preferably circular recesses 123, through which are passed the bodies 124 of the retaining pins 125. These retaining pins have slots 126 cut therein with their ends slightly diverged, the pins as a whole resembling the ordinary clothes pin construction and it will be understood that when the interlocking elements are arranged for single candidate groups that every abutment member will have its two pins 125 in place so as to confine the interlocking elements to their particular location, and prevent more than one interlocking element being simultaneously turned or operated. When a multi-candidate group is to be formed, so many of the pins 125 will be removed as are necessary to throw the required number of interlocking elements into the common group.

Where a large multi-candidate group is formed, I may remove some of the resistance to operation which would result from the weight of the upper interlocking elements of the groups on the bottom ones by interposing between the stems 120 of the free abutments strong helically coiled expanding springs 127, as shown in Fig. 13. These springs can contract, if necessary, to the amount that is necessary to permit the proper expansion of the interlocking elements under any arrangement of the keys, but they are strong enough to hold the abutments spaced apart a little more than the distance they would occupy if the springs were not employed, and in this manner the weight of the keys at any point in the multi-candidate group will not be greater than the weight of the keys devoted to a single office, thereby reducing the amount of friction which would otherwise be met with in the operation of the device.

To return the interlocking elements to their inoperative position, I employ a pair of cam bars 128, one in the casting 22 and the other in the casting 24, which bars are given a reciprocation as the voter leaves the booth by mechanism to be described, which reciprocation will carry the bars from the full line position shown in Figs. 2 and 2ª to the dotted line position, and half way back. The bars 128 have toward their right-hand ends the offset 129 to bring the operating ends 130 into the plane of the arms 131 and 132 which are secured at each end to the rods 133 and 134, respectively, which rods extend through the rear one of the pair of segmental slots formed in the interlocking elements 113 and the abutments 119. Such of the interlocking elements as are operated will have one or the other of the spokes 117 carried back substantially into engagement with the adjacent rods 133 and 134, so that as the rods are spread apart by the end 130 separating the curved levers 131 and 132, and the interlocking members will be rotated back into their inoperative position. Inasmuch as the connections between the interlocking straps 59 and the interlocking elements have a certain amount of lost motion, it is necessary to provide separate means for resetting the interlocking straps, and for this purpose I secure the vertical bars 135 and 136 to the horizontal bars 128 on either side of the interlocking straps, and provide the longitudinal recess 137 in the castings 22 and 24 to permit the reciprocation of the bars 135 and 136. These bars during the first half of their movement to the right, do not engage the offsets 103 and 106 on the interlocking straps, but during the second half of their movement in that direction, if any of the interlocking straps have been operated, they will be engaged by these bars and returned to their normal position in substantial synchronism with the return of the interlocking elements by the movement of the arms 131 and 132, the contact surfaces of these arms being curved in the shape shown to cause the interlocking straps and interlocking elements to move together in synchronism.

The lockout mechanism previously referred to is of the same general character as that shown in my Patent No. 1,044,799, granted November 19, 1912, but the rods 101 and 102 in my present construction are journaled at the top and bottom in bearing blocks 138 (see Figs. 1ª, 2ª and 4) which are pivoted in the crank arms or links 139, which are journaled in suitable bearings formed in the brackets 140 secured to the castings 22 and 24 and in the lugs 141 and 142 which may be formed integrally with the sides of the castings 22 and 24. The reduced upper ends 143 and 144 of the rods 101 and 102 carry adjusting knobs 46 and 47, which have the equi-distant lugs 145 on their under surface adapted to coöperate with the correspondingly shaped and located recesses 146 formed in the top plate 23 of the casing, and it will be apparent that when the lockout mechanism is to be readjusted for a voter having a different franchise, all that is necessary is to pull up the knob 46 or 47, as the case may be, carrying with it the rod 101 and 102, which while remaining parallel to its original position, as a whole, swings through the arc of the circle through an angle of 90° or more with the crank arms or links 139, to an extreme position, in which the projections 104 or 107, as the case may be, will be out of the range of the projections 103 and 106 so that the shafts can be turned without any interference, and after they have been turned to the desired position, they are swung down and locked by reason of the lugs 145 engaging with the recesses 146.

The register frame is made up of the end pieces 147 and 148, each of which carries at its upper and lower end the friction rollers 149, which rest upon the tracks 150 projecting inwardly from the vertical angle bars 26 and 28, so that the register frame as a whole is supported to move freely to the rear and back through a limited distance sufficient to disengage the actuating member 61 from the units wheels while the keys are being reset. For this purpose the top member 152 and the bottom member 153 of the register frame are provided with a pair of pins 154 which have the reduced upper portions 157 projecting through the cam slots 158 formed in the bars 128, and the cam portions of these slots are located, as will be seen by the examination, so that at a certain time after the resetting movement starts, i. e. after the bars 100 have positioned the keys in their operative or inoperative positions, the register frame will be moved to the rear to disengage the registers from their actuators so that the registers will not be unoperated as the keys are reset by the resetting mechanism already described.

The register frame has what may be called an internal frame that is made up of the vertical end bars 159 and 160, which are rigidly connected to the end pieces 147 and 148, and the coöperating bars 161 and 162 which are capable of movement to and from the bars 159 and 160, and for the purpose of effecting this movement, I provide the two vertical shafts 163 and 164, each of which is provided with a pair of worms 165 which mesh with the worm segments 166 which are journaled on the bearing pins 167 projecting inwardly from the end pieces 147 and 148. The bars 161 and 162 carry the pins 168, which project into the cam slots 169 formed in segments 166, as best seen in Fig. 5, and it will be obvious that as the shafts 163 are turned in one direction, the outer portion of the frame will be moved away from the inner portion, and vice versa. The shafts 163 and 164 are preferably provided with the miter gears 170 at their lower ends, which mesh with the miter gears 171 secured on the ends of the transverse shaft 172, and the upper end of the shaft 164 is provided with the miter gear 173 which meshes with the miter gear 174 formed on a short horizontal shaft 175 provided with a squared end so that the key can be applied to it to thereby turn both the shafts 163 and 164 simultaneously to separate the two parts of the frame when it is desired to reset the register wheels to zero. Referring to Figs. 3ª, 8, 9 and 10, it will be seen that the alternating plates 82 which are secured to the pieces 159 and 160 project beyond the shafts 86 of the register wheels and have the straight recess 175 for the units wheel shaft, the slightly inclined recess 176 for the tens wheel shaft and the still more inclined recess 177 for the hundreds wheel shaft. The alternating plates 83 which are secured to the bars 159 and 160 terminate some distance short of the shafts 86, and opposed to these plates 83 are the plates 178, which extend the rest of the way out to the plane of the outer edges of the register wheels, and these plates 178 which alternate with the plates 82 have the plain circular bearings 179 for the units wheel shafts, and slightly elongated bearings 180 for the tens wheel shaft and the still more elongated bearings 181 for the hundreds wheel shaft, so that it will be seen that as the plates 178 are moved outward by the movement of the bars 161 and 162 to which they are connected, the camming action of the recesses 176 and 177 on the shafts will cause the tens shaft to be moved a small distance farther away from the units wheel shaft and the hundreds wheel shaft to be moved still farther away from the units wheel shaft, so that the tens and hundreds wheels will all be moved a sufficient distance away from the units wheels and from each other so that they will be out of operative engagement and as the shafts 82 are turned by the knobs 182 secured to their other ends, they will carry the register wheels with them until their movement is interrupted. When the register frame as a whole has been moved to its outward position, and then in addition to that the plates 178 have been moved out as far as their connection with the plates 82 will permit, the peripheries of the register wheels will be brought into the plane of the vertical bars or plates 183, 184 and 185 respectively, which have their left-hand edges so located on the glass 32, to which they are secured, that when the register wheels are turned by the movement of their shafts, the carrying lugs 71 will engage the edges of these bars 183, 184 and 185 and stop all the register wheels on each shaft with their numerals in the same position, and when they are thus gotten in the same position it is a simple matter to turn the shaft forward or backward, as may be most convenient, until all the register wheels are brought with their zeros visible through the elongated sight spaces formed in the glass 32 by the strips 183, 184 and 185. When the registers are thus all reset, which can be done from outside of the glass by the manipulation of the mechanism described, the worm shafts 163 and 164 are turned in the opposite direction to bring the shafts 82 into their proper relative position and the registers are thus reset and ready for a new election. It will be understood that the portion of the frame made up of the plates 82 and 83 will be strengthened by the rods 186 extending through the height of the register frame and having the spacing tube 187 interposed between the adjacent plates to make the register frame construction rigid. Similarly, the shafts 188 will be extended through the vertical height of the register frame through apertures in the plates 178 and the tubes 189 will be interposed between the plates 178 to space them apart. By this novel register construction it will be seen that I have produced a mechanism by which the registers can be easily set to zero.

The free balloting mechanism, best illustrated in Figs. 1, 2, 3, 6 and 7, consists of the customary writing tablet 190, which extends between the castings 22 and 24, and which has the sheet of paper 191 fed thereover from the supply roller 192 to the storage roller 193. The front wall 38 of the casing is provided with the elongated slots 194, one for each office row, and back of these slots are mounted the cover plates 39, which have the apertures 196 (see Fig. 3) therein adapted to be brought into register with the apertures 194 when the plate has been slid to the left, so that a pencil can be inserted between the two apertures and a name written on the paper tablet in the proper row for the irregular candidates for that particular office. The cover plates 39 have the lugs 40 projecting out through the apertures 194 by which they are manipulated, and at the right hand end of the cover plate is a lug 197 to which is pivoted the lever arm 198 which has at its inner end an elongated slot 199, by which it is pivotally and slidingly mounted on the rod 200 extending between the castings 22 and 24, and supported at suitable intermediate positions by the brackets 201. The rod 200 is provided with suitable sleeves interposed between the different levers 198 to space them apart the proper distance, and their outer ends are pivoted, as before stated, to the slides 39, which have suitable bearings in the rear of the portion 38 of the face plate. The interlocking straps 59$^b$ for the irregular ballots extend through the vertical aperture between the angle iron 26 and the T bar 27, and are preferably formed with a loop at their left-hand ends, which loop has a connecting rivet 202 which passes through an elongated slot 203 in the associated lever 198. With this arrangement it will be evident that as the cover plate 39 is slid to the left for a distance of say three inches, the lever 198 will be swung to the left and at the same time thrust rearwardly and then drawn forwardly so as to permit of the straight line movement of the cover plate, and in this movement will carry with it the interlocking strap 59$^b$, which at its right-hand end is connected to an interlocking element just the same as the interlocking elements for the keys.

To prevent the cover plate being slid forward, thereby operating the interlocking mechanism, then writing a name, and then sliding it back, releasing the interlocking mechanism, which would permit unlawful voting by means of the irregular and regular candidates, I provide in connection with the end of each of the straps 59$^b$ a set of ratchet teeth 204, which are preferably formed on the loop of the interlocking strap, and coöperating with these ratchet teeth are a series of spring pressed dogs 205 which are pivoted on a shaft 206, and are spaced apart a suitable distance, preferably by making the body of the dog 205 of a width equal to the space occupied by each party roll and providing it with two ears turned back from the body by which it is pivoted on the shaft 206. A spline 207 extends the length of the shaft, and coöperates with the segmental recesses 208 in the dogs so that the dogs will be free to swing back to allow the teeth to pass as the interlocking straps are moved forward, and yet all the dogs can be swung back out of engagement with the teeth when it is necessary to reset the interlocking straps by giving the shaft 206 a slight rotation in the direction of the hands of a watch. The extreme ends of the shaft 206, which extend through the castings 22 and 24 are provided with the arms 208, which have anti-friction rollers 209 on their ends extending into the plane of the cam surface 210 formed on the bar 128 at the proper location so that the dogs 205 will be swung out of engagement with the teeth 204 to release the interlocking straps just prior to the time that they are engaged by the resetting mechanism and drawn backward.

The paper on the supply roller 192 is fed on to the storage roller 193 when any of the irregular balloting slides have been moved forward to expose the paper by the following mechanism: Journaled in the castings 22 and 24 are the arms 211, which are pivoted on the studs 212 projecting upward and downward from the castings 22 and 24 respectively, and the outer ends of these arms are connected by the rod 213 which passes through the substantially segmental recesses 214 in the castings 22 and 24, and extend down across the front of the machine in front of the cover plates and in the path of the projections 40 thereof. Toward the end of the movement of the cover plates after the interlocking mechanism has been fully operated the projections 40 engage the rod 213 and necessitate its being swung from the full line position in Fig. 2 to the dotted line position. The arms 211 have pivoted to their inner ends by the pins 215 the toggle bars 216, which have projecting downwardly from their free ends the pins 217 which extend through the slots 218 formed in the castings 22 and 24 and into the interior of the machine, and through the elongated slot 219 formed in the rack plates 220 which are pivotally supported from the adjacent portion of the bar 129 by the links 221, 222 and 223 which are pivoted on the pins 224, 225 and 226 extending inwardly from the bars 128 and through suitable elongated slots formed in the castings 22 and 24. The rack bars 220 have the large elongated apertures 227 therein, one side of which is provided with the teeth 228, constituting a rack bar, which teeth are adapted to engage with the teeth of the spur gear pinions 229 secured on the ends of the actuating shaft 230 journaled in suitable bearings in the castings 22 and 24. This shaft 230, as best seen in Fig. 6, has a series of toothed disks 231 spaced apart thereon at a distance equal to the width of an office row by the disks 232, the disks 231 being thin metallic disks having ratchet teeth which will engage with the surface of the paper 191 on the rolls 192 and 193 and will not only serve to feed the paper forward but will also serve by the slight punctures made, to form a sort of ruling to indicate the division of the paper into the necessary rows for the different offices. With the plates 220 mounted as described, it will be evident that when the toggle formed by the levers 211 and links or bars 216 is straightened out and moved slightly past the center to the dotted line position shown in Fig. 2, the plates 227 will be moved so as to carry the teeth 228 into the plane of the gears 229 so that when the plates 220 are moved to the right, they will rotate the shaft 230 in the proper direction to feed the necessary amount of paper from the supply roll to the storage roll.

The storage roller 193 and the supply roller 192 have the bearing blocks 230$^a$ and 231$^a$, respectively, in which their shafts are journaled, and these bearing blocks extend through the elongated rectangular apertures 232 and 233 formed in the plates 234 and 235 of the casting 236 secured to the castings 22 and 24 in the manner best shown in Fig. 6 and serving also to support the writing plate 190, as best shown in Fig. 6. The bearings 230 and 231 are connected by the pair of helically coiled contractile springs 237 and 238 so as to draw the supply and storage rollers firmly against the actuating disks 231 in all positions of the supply and storage rollers, which positions necessarily vary as the diameters of the two rolls respectively increase and diminish.

To prevent the possibility of the rod 213 being moved without any of the cover plates being moved sufficiently to actuate the interlocking mechanism and thus permitting maliciously inclined persons wasting the paper in the free balloting device, I provide the locking mechanism best shown in Figs. 2 and 3, to prevent the movement of the rod 213 until some one of the cover plates 195 have been moved. For this purpose, it will be seen that I pivot just inside the castings 22 and 24 the arms 239, which have their swinging ends connected by the rod 240 which is in the planes of all of the arms 198 and which is engaged by all of them after they have swung a suitable angular distance, the engaging surface 241 of these arms being recessed to get the proper angular relationship without changing the position of the parts. The arms 239 are rigidly connected by means of the shaft 200 to which they are pinned to the levers 242 which carry at the ends of their long arms the pins 243 which project through the elongated slots 244 in the end of the arms 245 of a three-armed lever pivoted at 246 upon the castings 22 and 24. The second arm 247 is provided with a recess 248 which is adapted to engage the rivet pin 215 between the arms 211 and 216 and lock the toggle lever formed by these arms from movement until the lever 247 has been swung out by the movement of the lever 242. The strong helically coiled contractile spring 249 connects the arm 250 of the lever 242 with the third arm 251 of the three-armed lever, and serves to return the locking lever 247 to its locking position when it is thrown past the center by reason of the cam 252 carried by the bar 128 engaging the roller 253 carried by the lever 242, this cam surface 252 engaging the roller 253 toward the end of the movement of the bar 128 to the right so that the arm 247 will not act on the pin 215 to break the toggle and swing the teeth 228 to the plate 220 out of engagement with the spur gears 229 until they have been rotated the proper distance. The bearing pins 212 and 217 are connected by the strong helically coiled contractile springs 254 which serve to restore the toggles to their normal position as soon as they have been moved past the center by the movement of the arms 247.

The resetting mechanism is all actuated by the shaft 255 which is journaled in the castings 22 and 24, and has one or both ends extending outside of the casing so as to receive a bail or some other operating arm by which the shaft 255 can be rotated through say 90° as the voter opens the booth to leave the machine. This shaft is provided with the segmental gears 256 at its upper and lower ends, which gears mesh with the pinions 257 secured on the stub shafts 258 journaled in the bearings 259 formed in the castings 22 and 24, and the proportions of the segment 256 and the gear 257 are such as the shaft 255 is rocked through 90° it will swing the shaft 258 through 270°. To compel a complete stroke of the shafts 258, I form on the periphery of the cam disks 260 secured on the outer ends of the shafts 258 the teeth 261, which are adapted to coöperate with the spring-held dogs 262 pivoted on the castings 22 and 24 in the customary manner so as to compel the complete stroke of the shaft in both directions and prevent any attempt to beat the machine by partial movements of the resetting mechanism. The cam disks 260 are provided with the cam slots 263 through which pass the operating rollers 264 projecting at right angles from the end of the bars 100ª and 100ᵇ which are connected by the positioning bars 100, and the position of the operating portion of this cam slot will be seen to be such that the key positioning mechanism will operate as soon as the voter starts to open the booth to leave the machine. The cam disks 260 are also provided with the rollers 265 projecting outward into the slots 266 formed in the crosshead 267 attached to the left-hand end of the bar 128, and it will be apparent that with this connection, as the shaft 255 is swung through 90° and the shafts 258 are swung through their 270° from the position shown in full lines in Fig. 2, the bar 128 will first be moved to the right for say three inches, and then moved back to the left for one and one-half inches, and will remain in this last position while the booth is open. In this position, the register wheels are out of engagement with the keys, and the keys are unlocked so that they can be manipulated while the booth is open, but if any key is left in an operative position when the voter closes the booth, the first movement of the bar 128 through the one and one-half inches to the right will serve to reset all the keys so that no damage is done by the fact that they are unlocked while the voter is in the booth.

The general operation of the machine will be readily understood from the foregoing description, as it will be apparent that when the voter is in the machine and with the booth closed, the parts are in the position shown in Fig. 2, and as he operates the keys, the registers will be at the same time operated, and if they are not carefully positioned as he opens the booth to leave it, the bars 100ª and 100ᵇ will be actuated by the cam slot 263 the first thing to position the keys and registers, after which, the cam slots 158 will immediately operate to move the registers out of engagement with the keys, after which the resetting mechanisms proper will operate to return the interlocking mechanism and the keys to their normal position, and toward the end of this resetting movement, the resetting mechanism for the free balloting device will operate by reason of the cam 252 engaging the pins 253.

While I have herein shown and described a novel counter wheel and registering mechanism which is capable of use for other purposes than in voting machines, I do not herein claim the same, but reserve the subject-matter thereof for a divisional application.

While I have shown and described my invention as embodied in the form which I at present consider best adapted to carry out its purposes, it will be understood that it is capable of modifications and that I do not desire to be limited in the interpretation of the following claims except as may be necessitated by the state of the prior art.

What I claim as new and desire to secure by Letters Patent of the United States is:

1. In a device of the class described, an interlocking element consisting of a metal disk and stem, the stem provided with means for engaging an interlocking strap, and the disk having a bearing aperture at its center, an outer cam ring, and intermediate semiannular recesses.

2. In a device of the class described, the combination with a rod, of a plurality of interlocking elements strung thereon and each consisting of a metal disk and stem, the stem provided with means for engaging an interlocking strap, and a disk having a bearing aperture at its center through which the rod passes, an outer cam ring, and intermediate semi-annular recesses, said stems being alternated, and resetting rods in the semi-annular recesses, substantially as described.

3. In a device of the class described, the combination with a rod, of a series of interlocking elements strung thereon, each consisting of a metal disk and stem, the stem provided with means for engaging an interlocking strap, and the disk having a bearing aperture at its center on the rod, an outer cam ring, and intermediate semi-annular recesses, abutment members having stems at right angles to the stems on the interlocking elements, channels for the abutment-member stems, and engaging members for said abutment-member stems.

4. In a device of the class described, the combination with a vertical rod, of plural series of interlocking elements strung thereon, each consisting of a metal disk and stem, the stem provided with means for engaging an interlocking strap, the alternate stems being pointed in opposite directions, and the disk having a bearing aperture at its center through which the rod passes, an outer cam ring, and intermediate semi-annular recesses, abutment members interposed between said series and similar to the interlocking elements but having the stems at right angles to those of said interlocking elements, channels for the abutment-member stems, and engaging members coöperating with said channels and abutment-member stems to form single and multi-candidate groups.

5. In a device of the class described, the combination with a vertical rod, of plural series of interlocking elements strung thereon, each consisting of a metal disk and stem, the stem provided with means for engaging an interlocking strap, the alternate stems being pointed in opposite directions, and the disk having a bearing aperture at its center through which the rod passes, an outer cam ring, and intermediate semi-annular recesses, abutment members interposed between said series and similar to the interlocking elements but having the stems at right angles to those of said interlocking elements, channels for the abutment-member stems, engaging members coöperating with said channels and abutment-member stems to form single and multi-candidate groups, resetting rods passing through the semi-annular recesses, and means for swinging said resetting rods about the central rod as a center to reset the interlocking elements.

6. In a device of the class described, the combination with a rotary cam member having a stem with the recess therein elongated radially of an interlocking strap adapted to move in a straight line and having engagement with the recess which is elongated to permit of the continued engagement of the strap and the stem despite the rotation of the stem.

7. In a device of the class described, the combination with a rotary cam member having a stem with a recess elongated transversely, of an interlocking strap having engagement with said recess which is elongated to permit of the changing of the angle of the strap without necessarily swinging the cam member.

8. In a device of the class described, the combination with a rotary cam member having a stem with a recess therein elongated both radially and transversely, of an interlocking strap adapted to move in a straight line and having an engagement with the recess which is elongated radially to permit of the continued engagement of the strap and stem despite the rotation of the stem, and which is elongated transversely to permit of the changing of the angle of the strap without necessarily swinging the cam member.

9. In a device of the class described, swinging cam disks each having a plurality of cams equidistantly located and adapted to spread the disks without tilting during the first part of the movement and to move idly during the latter part.

10. In a device of the class described, the combination with a plurality of keys, of a corresponding plurality of registers the operation of which is adapted to be controlled thereby, a corresponding plurality of cam interlocking disks each having a plurality of cams equidistantly located and adapted to spread the disks without tilting during the first part of the movement and to move idly during the latter part, connections between the keys and the cam disks, and connections between the keys and the coöperating registers whereby the latter will be operated during the latter part of the movement of the keys after the cam has acted.

11. In a device of the class described, the combination with a plurality of keys, of a corresponding plurality of registers the operation of which is adapted to be controlled thereby, a corresponding plurality of cam interlocking disks each having a plurality of cams equidistantly located and adapted to spread the disks without tilting during the first part of the movement and to move idly during the latter part, connections between the keys and the cam disks, connections between the keys and the coöperating registers whereby the latter will be operated during the latter part of the movement of the keys after the cam has acted, and positioning mechanism returning the keys unless they have been operated far enough to actuate the cams and forcing them on if they have been operated far enough to actuate the cams but not complete the actuation of the register.

12. In a voting machine, the combination with interlocking elements, of straps coöperating therewith, lost-motion connections between the straps and interlocking elements, resetting means for the interlocking elements, and separate resetting means for the straps operating simultaneously with the other resetting means.

13. In a voting machine, the combination with interlocking elements, of keys, lost-motion connections between the keys and the interlocking elements including interlocking straps, resetting means for the interlocking elements, and separate resetting means for the straps operating simultaneously with the other resetting means.

14. In a voting machine, the combination with interlocking elements, of straps coöperating therewith, lost-motion connections between the straps and interlocking elements, resetting means for the interlocking elements, and separate resetting means for the straps operating simultaneously and synchronously with the other resetting means.

15. In a voting machine, the combination with interlocking elements, of keys, lost-motion connections between the keys and the interlocking elements including interlocking straps, resetting means for the interlocking elements, and separate resetting means for the straps operating simultaneously and synchronously with the other resetting means.

16. In a voting machine, the combination with swinging interlocking elements and a swinging resetting element coöperating therewith, of reciprocating interlocking straps loosely connected to the interlocking elements and having a reciprocating resetting member, and a curved member carried by the swinging resetting element engaged by the reciprocating member to cause the interlocking element and the straps to be moved in synchronism.

17. In a voting machine, a swinging actuator having the actuating lug, recesses on either side thereof, the circular locking surface, the positioning cam surface, and the radial slot.

18. In a voting machine, the combination with a swinging actuator having a radial slot, of a swinging key having a radial slot, and an interlocking element connected to said key and actuator by a pin passed through said slots.

19. In a voting machine, the combination with a swinging key, of a swinging actuator having the positioning cam surfaces, a register wheel engaged by said actuator, a bar to engage the positioning surfaces, and means for first moving the bar and then moving the register wheel out of engagement with the actuator.

20. In a voting machine, the combination with a plurality of swinging keys, of a corresponding plurality of actuators having positioning cam surfaces, a corresponding plurality of register wheels engaged by the actuators, a plurality of inter-locking members acting during the first part of their movement, the actuators operating during the last part of their movement, a bar to engage the positioning surfaces, and means for first moving the bar and then the register wheels out of engagement.

21. In a voting machine, the combination with a plurality of keys, of a corresponding plurality of actuators having locking surfaces, a corresponding plurality of register wheels engaged by the actuators, a corresponding plurality of interlocking members moved by the actuators and acting during the first part of their movement, the actuators operating during the last part of their movement to operate the registers and the locking surfaces holding the register wheels until the interlocking mechanism has been effectually moved.

22. In a voting machine, the combination with a plurality of keys, of a corresponding plurality of actuators having positioning cam surfaces and locking surfaces, a corresponding plurality of register wheels engaged by the actuators, a corresponding plurality of interlocking members moved by the actuators and acting during the first part of their movement, the actuators operating during the last part of their movement to operate the registers and the locking surfaces holding the register wheels until the interlocking mechanism has been effectually moved, a bar to engage the positioning surfaces, and means for first moving the bar and then moving the register wheels out of engagement with the actuators.

23. In an interlocking mechanism, the combination with rotary cam members, of means for rotating the alternate cams in opposite directions, said cam members being provided on their adjacent faces with coöperating engaging surfaces on both faces in three different planes, and stops to limit the movement of said members along the axis of their rotation.

24. In an interlocking mechanism, the combination with the groups of rotary cam members, of means for rotating the alternate cams in opposite directions, said cam members being provided on both faces with coöperating engaging surfaces in three different planes, a stop between each group of cam members, and means for securing the intermediate stops or not, as desired, for multi-candidate or single-candidate voting.

25. The interlocking element, consisting of the thin metallic disk and stem, the disk having the engaging surfaces on both faces in three different planes connected by cam surfaces.

26. The interlocking element, consisting of the thin metallic disk and stem, the disk having the eight plane engaging surfaces, four being equi-distant and on the same plane and the other four being intermediate and alternately on planes above and below the intermediate surfaces, and the eight cam surfaces connecting the plane surfaces.

27. The interlocking element, consisting of the thin metallic disk and stem, the disk having the eight plane engaging surfaces on both sides, four being equi-distant and on the same plane and the other four being intermediate and alternately on planes above and below the intermediate surfaces, and the eight cam surfaces connecting the plane surfaces.

28. In a voting machine, the combination with a casing having an aperture therein, of a cover plate adapted to slide back of the aperture, a lever connected to the slide, and an interlocking strap connected to the lever.

29. In a voting machine, the combination with a casing having an aperture therein, of a cover plate adapted to slide back of the aperture, a lever connected to the slide, an interlocking strap connected to the lever, detent teeth on the interlocking strap, a dog coöperating with the teeth, and means for rocking the dog to release the strap.

30. In a device of the class described, the combination with a casing having an aperture therein, of a paper supply, mechanism for actuating the paper supply, means extending outside of the casing for controlling the movement of the actuating mechanism, a cover for the aperture, regular balloting mechanism, interlocking mechanism between the cover and the regular balloting mechanism operated by the cover during the first portion of its complete movement, and a locking mechanism for the actuating mechanism released by the movement of the cover after the interlocking mechanism has been actuated thereby.

31. In a device of the class described, the combination with a casing having a plurality of apertures therein, of a paper supply adjacent the apertures, mechanism for actuating the paper supply, means extending outside of the casing for controlling the movement of the actuating mechanism, a plurality of covers for the apertures, a series of regular balloting mechanism for each cover, interlocking mechanism between the cover and its associated series of regular balloting mechanism operated by the cover during the first portion of its complete movement, and a locking mechanism for the actuating mechanism released by the movement of any of the covers after its interlocking mechanism has been actuated thereby.

32. In a device of the class described, the combination with a casing having an aperture therein, of a paper supply adjacent the aperture, mechanism for actuating the paper supply, means extending outside the casing for controlling the movement of the actuating mechanism, a cover for the aperture, and locking mechanism for the actuating mechanism released by the movement of the cover after it has been moved a certain distance.

33. In a device of the class described, the combination with a casing having a plurality of apertures therein, of a paper supply adjacent said apertures, mechanism for actuating the paper supply, means extending outside of the casing for controlling the movement of the actuating mechanism, a corresponding plurality of covers for the apertures, and locking mechanism for the actuating mechanism released by the movement of any of the covers after they have been moved a certain distance less than their complete movement.

34. In a device of the class described, the combination with the shaft, of the keys strung thereon, the straight-ticket arms mounted on the shaft, and the bar connecting the arms and coöperating with the keys to swing them into operative position.

35. In a device of the class described, the combination with the shaft located within the casing of the machine, the keys strung thereon and having their stems projecting through the casing, the straight-ticket arms mounted on the shaft and extending without the casing, and the bar outside the casing connecting the arms and coöperating with the keys to swing them into operative position.

36. In a device of the class described, the combination with the regular ballot-selecting members freely movable into and out of operative position by the voter, of the irregular ballot covers movable into operative position, detent mechanism to prevent their being moved back until the machine is reset, interlocking members connected with said ballot-selecting members and covers, and means for returning the regular ballot-selecting members and the covers to inoperative position after the ballot has been finally voted.

37. In a device of the class described, the combination with the regular ballot-selecting members freely movable into and out of operative position by the voter, of the irregular ballot covers movable into and out of operative position, the paper rolls carrying the paper adapted to pass beneath the covers, detent mechanism to prevent the covers being moved back until the machine is reset, interlocking members connected with said regular ballot-selecting members and covers, and means for returning the regular ballot-selecting members and the covers to inoperative position and advancing the paper if a cover has been moved after the ballot has been finally voted.

38. In a device of the class described, the combination with the regular ballot-selecting members freely movable into and out of operative position by the voter, of the irregular ballot covers movable into operative position and provided with ratchets, detent pawls coöperating therewith, interlocking members connected with said ballot-selecting members and covers, and means for releasing the pawls and returning the ballot-selecting members and covers to inoperative position after the ballot has been finally voted.

39. In a device of the class described, the combination with the regular ballot-selecting members freely movable into and out of operative position by the voter, of the irregular ballot covers movable into operative position and provided with ratchets, detent pawls coöperating with said ratchets, interlocking members connected with said ballot-selecting members and covers, means for returning the regular ballot-selecting members and covers to inoperative position after the ballot has been finally voted, and means to release the pawls toward the close of the resetting movement.

40. In a device of the class described, the combination with the regular ballot-selecting members freely movable into and out of operative position by the voter, of the irregular ballot covers movable into operative position and provided with the ratchets, the detent pawls coöperating with the ratchets, interlocking members connected with said ballot-selecting members and covers, means for returning the regular ballot-selecting members, means for moving the pawls to release the covers toward the end of the resetting movement, and means for returning the covers after they are released.

In witness whereof, I have hereunto set my hand and affixed my seal, this 31st day of August, A. D. 1910.

JOHN HOWARD McELROY. [L. S.]

Witnesses:
JULIA M. BRISTOL,
JNO. G. ELLIOTT.